United States Patent [19]
Davis et al.

[11] Patent Number: 5,395,648
[45] Date of Patent: Mar. 7, 1995

[54] CERAMIC-CERAMIC COMPOSITE PREPREGS AND METHODS FOR THEIR USE AND PREPARATION

[75] Inventors: H. O. Davis, Alameda; Marvin Pennell, San Leandro; Gary Patz, Walnut Creek, all of Calif.

[73] Assignee: Kaiser Aerospace and Electronics Corporation, Foster City, Calif.

[21] Appl. No.: 433,946

[22] Filed: Nov. 9, 1989

[51] Int. Cl.$^6$ ............................................. B05D 3/00
[52] U.S. Cl. ................................. 427/192; 427/387; 427/397.7
[58] Field of Search ............. 427/190, 192, 387, 397.7

[56] References Cited

U.S. PATENT DOCUMENTS

| | | | |
|---|---|---|---|
| Re. 31,447 | 11/1983 | Baney et al. | 264/65 |
| 3,330,697 | 7/1967 | Pechini | 117/215 |
| 3,849,181 | 11/1974 | Green | 117/106 R |
| 3,894,863 | 7/1975 | Lachman et al. | 75/0.5 R |
| 4,101,354 | 7/1978 | Shaffer | 156/60 |
| 4,110,386 | 8/1978 | Yajima et al. | 264/29.5 |
| 4,132,828 | 1/1979 | Nakamura et al. | 428/366 |
| 4,158,687 | 6/1979 | Yajima et al. | 264/60 |
| 4,275,095 | 6/1981 | Warren | 427/228 |
| 4,278,729 | 7/1981 | Gibson et al. | 428/368 |
| 4,310,481 | 1/1982 | Baney | 264/65 |
| 4,310,482 | 1/1982 | Baney | 264/65 |
| 4,314,956 | 2/1982 | Baney et al. | 264/65 |
| 4,317,856 | 3/1982 | Huthwelker et al. | 428/273 |
| 4,414,403 | 11/1983 | Schilling, Jr. et al. | 556/430 |
| 4,472,591 | 9/1984 | Schilling, Jr. et al. | 556/430 |
| 4,492,681 | 1/1985 | Endou et al. | 423/345 |
| 4,497,787 | 2/1985 | Schilling, Jr. et al. | 423/345 |
| 4,546,163 | 10/1985 | Haluska | 528/14 |
| 4,552,786 | 11/1985 | Berneburg et al. | 427/249 |
| 4,560,589 | 12/1985 | Endou et al. | 427/249 |
| 4,568,594 | 2/1986 | Hordonneau et al. | 428/113 |
| 4,618,529 | 10/1986 | Yamamura et al. | 428/224 |
| 4,642,271 | 2/1987 | Rice | 428/698 |
| 4,722,860 | 2/1988 | Doljack et al. | 428/260 |
| 4,735,856 | 4/1988 | Schultz et al. | 428/366 |
| 4,753,856 | 6/1988 | Haluska et al. | 428/698 |
| 4,837,230 | 6/1989 | Chen et al. | 501/88 |
| 5,009,961 | 4/1991 | Niebylski | 428/446 |
| 5,017,529 | 5/1991 | Blum et al. | 501/95 |
| 5,024,979 | 6/1991 | Debalg-Valade et al. | 501/95 |
| 5,055,431 | 10/1991 | Blum et al. | 501/97 |

FOREIGN PATENT DOCUMENTS 59-145787  8/1984  Japan .

OTHER PUBLICATIONS

Eror and Anderson (1986) "Polymeric Precursor Synthesis of Ceramic Materials", Better Ceramics Through Chemistry II, C. J. Brinkes, D. E. Clark, D. R. Ulrich, eds. Material Research Society, Pittsburg, Pa., pp. 571–577.

Primary Examiner—Peter A. Nelson
Attorney, Agent, or Firm—Townsend and Townsend Khourie and Crew

[57] ABSTRACT

Prepregs for producing ceramic-ceramic composite articles are prepared by impregnating a ceramic substrate with a liquid ceramic precursor material. By properly controlling the viscosity of the precursor material and the conditions of application of the precursor to the substrate, a prepreg which can retain the precursor may be obtained. The prepreg is suitable for shaping into a wide variety of geometries, and the ceramic precursor may be transformed into the corresponding ceramic matrix material by curing and conversion steps.

13 Claims, 1 Drawing Sheet

CERAMIC-CERAMIC COMPOSITE PREPREGS AND METHODS FOR THEIR USE AND PREPARATION

BACKGROUND OF THE INVENTION

1. Field of the Invention

The present invention relates generally to the preparation of structural ceramic materials, and more particularly to the preparation of ceramic-ceramic prepregs for use in the manufacture of ceramic-ceramic composite articles.

Structural ceramic materials are utilized in a variety of high temperature applications which may also require high strength. For example, structural ceramics are utilized as high temperature insulating materials in the construction of rocket motors and as fan blades, combustion chambers, and after burners in the construction of jet engines. They may also find use as structural panels and members in advanced aerospace vehicles.

Heretofore, structural ceramics have usually been produced by one of two processing techniques. In a first technique, referred to as hot press sintering, ceramic powders, such as alumina, silicon carbide, boron nitride, and the like, are subjected to very high pressures and temperatures, typically in the range from about 1500° C. to 2100° C. While the ceramics produced by such hot press processes are generally satisfactory, the high temperature required will often degrade any reinforcement materials present. For that reason, hot press ceramics are not normally reinforced and therefore possess limited fracture toughness and strength.

Reinforced ceramic composites have often been prepared by chemical vapor deposition (CVD) of a ceramic precursor material onto a fiber reinforcement substrate. The precursor material is converted into corresponding ceramic by conventional techniques, and the process has the advantage that the reinforcement fibers are not exposed to excessively high temperatures. The process, however, is limited in that CVD often results in a non-uniform penetration of the reinforcement substrate, leading to non-uniform properties in the resulting composite product.

A relatively new technique for producing ceramic-ceramic composites involves the use of a liquid ceramic precursor material. A ceramic or other reinforcement substrate is first impregnated with a low viscosity liquid precursor, and the precursor is then converted to the corresponding ceramic matrix, typically by high temperature conversion or pyrolysis. The temperatures and pressures involved, however, are substantially lower than those required for the hot press sintering and the likelihood of degradation of the substrate is substantially reduced.

The use of low viscosity liquid ceramic precursor materials in the preparation of ceramic-ceramic composite articles has generally been limited to "wet lay-up" techniques where the reinforcement substrate is impregnated with the low viscosity ceramic precursor material and the impregnated substrate is substantially immediately cured to set the precursor prior to shaping of the substrate. Shaping of the substrate and conversion of the precursor to the corresponding ceramic material is then performed with minimum delay in order to produce the final composite article.

Although generally workable, the use of such wet lay-up techniques for producing ceramic-ceramic composites suffers from several limitations. First, reinforcement substrate impregnated with low viscosity ceramic precursor materials are very difficult to handle and shape. Such difficulties have limited the geometries which can be formed by these techniques. Second, it has been generally difficult to control the penetration of relatively low viscosity precursor materials into reinforcement substrates, frequently leading to non-uniform and/or incomplete penetration. Such non-uniform penetration can result in a product having non-uniform properties and in some cases reduce the strength of the final product. This is a particular problem with composites having relatively high fiber volumes, where the ability to maintain uniform fiber volume is particularly limited. Finally, wet lay-up technology frequently leaves voids in the composite matrix which have a deleterious effect on final product strength.

For these reasons, it would be desirable to provide methods for controlling the amount and uniformity of a ceramic precursor material which is introduced to each ply of a reinforcement substrate to maintain a constant substrate to matrix ratio. It would be further desirable to provide such methods where highly uniform penetration of a reinforcement substrate with a liquid precursor material can be achieved, even where the final product will have a relatively high fiber volume. The impregnated substrates will provide a material system which can be used for forming ceramic-ceramic substrates where the manipulation and shaping of the composite article is facilitated.

2. Description of the Background Art

U.S. Pat. No. 4,837,230, the disclosure of which is incorporated herein by reference, describes the fabrication of ceramic-ceramic composite materials using wet lay-up techniques as described above. Copending application Ser. No. 07/166,958, the disclosure of which is incorporated herein by reference, describes the production of aluminum oxide ceramic composites using similar wet lay-up techniques.

SUMMARY OF THE INVENTION

According to the present invention, ceramic composite prepregs are prepared by introducing a viscous ceramic precursor material onto a refractory reinforcement substrate, such as a ceramic reinforcement fabric. The viscosity of the precursor material is sufficient to provide stable prepreg structures where loss of the precursor material from the reinforcement substrates is substantially inhibited. The viscosity of the ceramic precursor material can be increased by limiting the amounts of added solvent(s) (if present) and further by adding a ceramic fiber or powder as a filler material. In a preferred embodiment, a thixotropy modifying agent may be combined with the ceramic precursor material in order to increase the thixotropic nature of the matrix precursor. In this way, the apparent viscosity of the precursor is reduced when pressure is applied to impregnate the substrate as described in more detail hereinafter. Usually, the precursor will be introduced by immersion or spreading and impregnation effected by applying external pressure.

The resulting prepreg structure may be conveniently manipulated and shaped into a desired geometry without substantial loss of precursor. Moreover, the density and uniformity of the precursor material is significantly greater than was previously available with the conventional wet lay-up techniques where the precursor was manually applied to the reinforcement substrate.

Once the prepreg is shaped into its desired geometry, the article may be cured to set the final desired geometry, typically by heating to induce cross-linking or partial cross-linking in the liquid ceramic precursor. The cured precursor will then be converted to a ceramic matrix layer by pyrolysis or other conventional conversion steps.

DESCRIPTION OF THE SPECIFIC EMBODIMENTS

Figure 1:
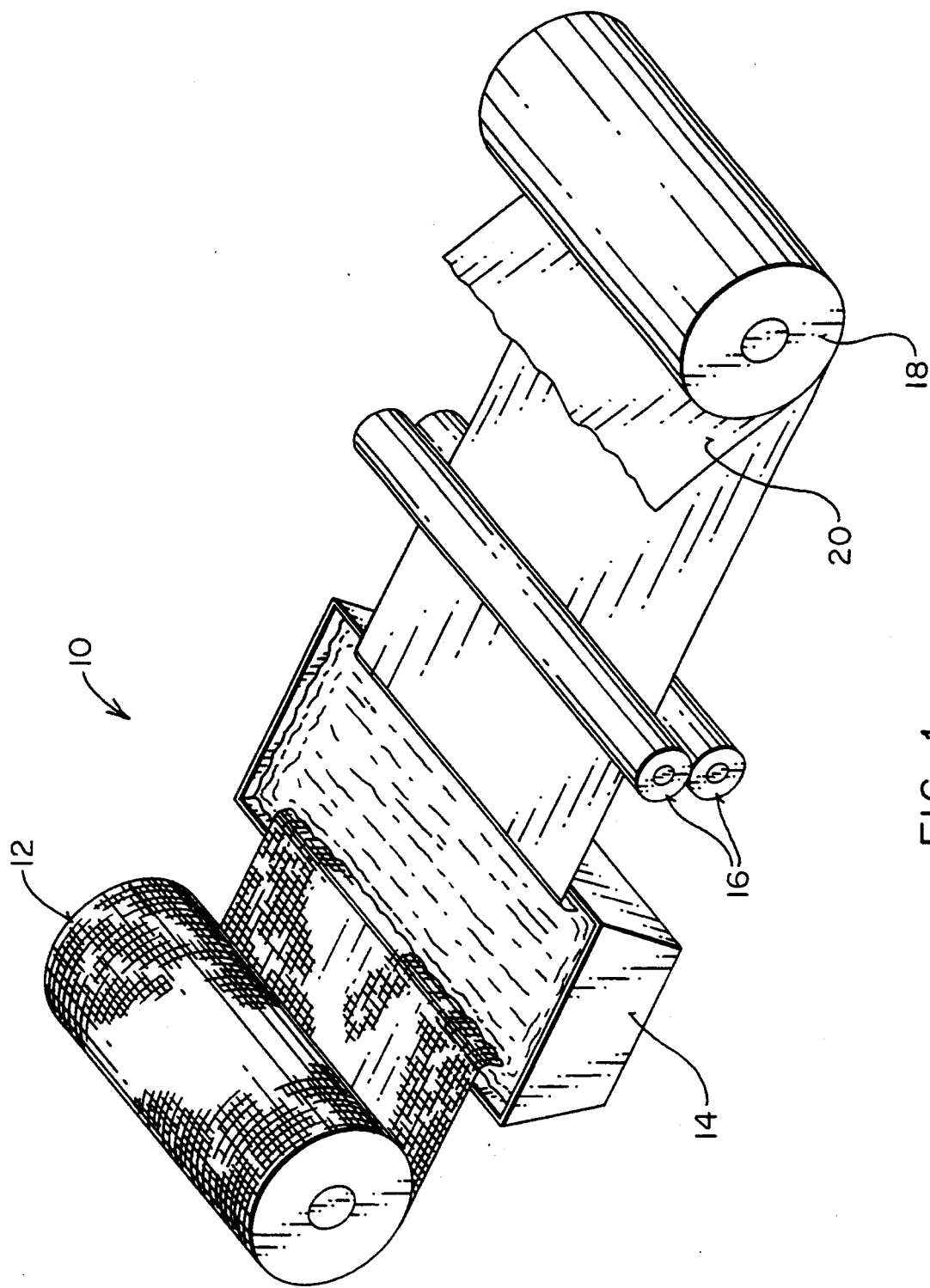
FIG. 1 illustrates apparatus suitable for preparing ceramic-ceramic prepreg materials according to the method of the present invention.

For the most part, the present invention will utilize conventional two- or three-dimensional reinforcement substrates produced by shaping refractory strands, either single fibers or yarns, to desired geometries including fabrics, tapes, films, cones, and the like. The strands may be composed of a wide variety of materials, such as alumina, beryllium, boron carbide, boron nitride, carbon, silicon carbide, silicon dioxide, silicon nitride, tungsten, zirconia, and combinations thereof. Typically, single fibers will have a diameter in the range from about 1 to 150 microns, yarns will be comprised of from about 100 to 10,000 fibers, more typically from about 200 to 1000 fibers.

A variety of suitable shaping techniques are available including two-dimensional weaving, filament winding, tape wrapping, three-dimensional weaving, multiple-dimensional weaving, and various pultrusion processes, where linear elements are formed. A number of proprietary three-dimensional weaving systems are available, such as the Kaiser/Techniweave system, the Ultraweave system available from FMI, the Avco/Brochere system available from Avco/Brochere, Lowell, Mass. and the Aerospatiale system available from Hercules, Inc.

A preferred method for forming three-dimensional reinforcement substrates suitable for use in the present invention is described in U.S. Pat. No. 4,741,873, the disclosure of which is incorporated herein by reference.

The liquid ceramic precursor material is selected to yield a desired ceramic matrix after an appropriate conversion step. Particularly suitable are liquid organometallic materials which may be applied to the reinforcement substrate in the form of a viscous liquid, as described in more detail hereinbelow. A list of suitable precursor materials together with the corresponding ceramic matrix is set forth in Table 1.

TABLE 1

| Precursor Material | Ceramic Matrix |
|---|---|
| Polysilanes | Silicon carbide |
| Polysiloxanes | Silicon carbide |
| Polycarbosilanes | Silicon carbide |
| Polyvinylsilanes | Silicon carbide |
| Polysilazane | Silicon nitride |
| Ionic Aluminum in Organic Solvent | Alumina, Mullite |

The liquid ceramic precursor materials are usually applied by dipping, spreading, vacuum impregnation, extrusion, or other conventional techniques, as is described in more detail hereinafter. After application, external pressure will usually be applied in order to uniformly impregnate the reinforcement substrate with the ceramic precursor material. Alternatively, a layer of the precursor material may also be metered onto a film and pressed against a layer or ply of reinforced substrate to produce a uniformly impregnated prepreg.

A second alternative is to apply the precursor in excess and to remove the material which does not penetrate the substrate by skimming or scraping after a time sufficient to achieve uniform penetration. In the case of two-dimensional substrates, such pressure can conveniently be applied by passing the substrate between a pair of opposed pressure rollers. The distance between the pressure rollers can be selected in order to remove excess precursor and to impart a preselected density of the precursor material on the substrate. Pressure may be applied to three-dimensional substrates by a variety of techniques, e.g., by using vacuum bags.

Preferred ceramic-ceramic precursor materials include polysilanes and solvated ionic aluminum, polysilanes suitable for use in the present invention are liquids at room temperature and may be converted to silicon carbide ceramics by exposure to temperatures in the range from about 800° C. to 1600° C., usually in the range from about 1000° C. to 1200° C. A variety of suitable polysilanes have been described in the patent and scientific literature. See, for example, U.S. Pat. Nos. 4,310,481; 4,310,482; 4,314,956; U.S. Pat. Nos. Re. 31,447; U.S. Pat. Nos. 4,546,163; 4,414,403; 4,472,591; and 4,497,787; as well as Schilling, Jr. et al. (1983) Ceramic Bulletin 63:912–915. Suitable polysilanes are available commercially from Union Carbide Corporation, Danbury, Conn. and Dow Corning Corporation, Midland, Mich. Particularly preferred is the use of Union Carbide Polysilane Y-12044.

Suitable alumina precursor materials will comprise an ionic aluminum solution comprising from about 5% to 35% aluminum by weight, more usually comprising about 15% to 25% aluminum by weight. The aluminum ion will be present in an aqueous organic solvent, typically an alcohol, in the presence of a strong mineral acid selected to promote the dissolution of the aluminum precursor substance, typically aluminum hydroxide, aluminum oxide, aluminum salt, or mullite. The aluminum precursor substances added to the aqueous alcohol mixture, typically at a weight percent in the range from about 10% to 50%, more typically in the range from about 20% to 40% with the alcohol:water volume ratio in the range from about 1:3 to 1:1, usually being about 3:5. After mixing, a sufficient mineral acid is added to promote dissolution of the aluminum precursor substance, typically being from about 10 to 20 volume percent of the initial water-alcohol mixture. The mixture is then heated to a temperature just below its normal boiling point, typically in the range from about 80° C. to 95° C., and the dissolution observed. Once the solution is clear, typically after several hours, the aluminum precursor substance will have been dissolved into solution.

The viscosity of the liquid ceramic precursor material utilized in the method of the present invention will be above about 1000 cp, usually being above about 10,000 cp, and preferably being above about 20,000 cp. The viscosity may be adjusted by a variety of techniques, including solvent evaporation, filler addition, addition of a thixotropy modifying agent, and the like, preferably being a combination of two or more of these approaches.

Usually, a ceramic filler material will be added to the liquid ceramic precursor in order to inhibit shrinkage and degradation of the ceramic material which results when the cured precursor is converted by pyrolysis. Suitable ceramic fillers are generally in the form of particulates, short fibers, or powders, usually being composed of alumina, boron nitride, silicon carbide, silicon dioxide, silicon nitride, or the like. Usually, the ceramic filler material will be the same as the ceramic matrix material which is eventually produced, although this is not necessary. The filler will normally be added to a final volume percent in the range from about 10 to 50, more usually being in the range from about 10 to 30, depending on the nature of the filler and the allowable shrinkage of the ceramic. A minimum filler addition of about 10% is normally required to avoid excessive shrinkage which can result in collapse of the product. In order to achieve the desired viscosity, filler will usually be added in the range from about 20 to 60% (by volume), more usually from about 30 to 40%.

In addition to adding the ceramic filler material, it will usually be desirable to add an organic thixotropy modifying agent which causes a further increase in the viscosity of the precursor material. The thixotropy modifying agent, however, has a pressure-dependent effect on the viscosity of the ceramic precursor material. In particular, application of external pressure on the material, e.g., by the opposed rollers used to impregnate the material into the reinforcement substrate, will cause an apparent decrease in viscosity. Release of pressure allows the ceramic material to return to its original viscosity. In this way, the viscosity of the ceramic precursor material can be effectively reduced during the impregnation process in forming the prepreg. This assures that the material is fully and uniformly introduced to the reinforcement substrate. After the pressure-assisted introduction, the material returns to its original viscosity so that it is inhibited from flowing from the prepreg. Suitable thixotropy modifying agents include organic polymer fibers, particularly aliphatic and aromatic polymers, such as polyethylene fibers, polypropylene fibers, nylon fibers (e.g., Kevlar®), and the like. Such fibers will typically be added in an amount from about 0.5 to 5 weight percent of the ceramic material, usually being added in an amount from about 1.0 to 2.0 weight percent.

Prior to introducing the liquid organic precursor material to the reinforcement substrate, it is usually desirable to form a refractory interface layer over the substrate. The refractory interface layer acts as a barrier or buffer which inhibits crack propagation through the ceramic matrix into the reinforcement material. Thus, the refractory interface layer acts to increase the strength (i.e., inhibit cracking) of the composite article. The preparation and introduction of such refractory interface layers is described in greater detail hereinbelow.

Once the ceramic prepreg material has been fabricated, it will usually be stored prior to subsequent shaping, curing, and conversion into the final product. In the case of two-dimensional prepregs, the material will usually be rolled on a cylinder, typically with a protective barrier layer between adjacent layers. Three-dimensional preforms will also usually be covered or otherwise protected during storage. In many cases, it will be desirable to store the preforms in a reduced temperature environment (e.g., below about 20° C.) in order to inhibit premature curing of the precursor materials. Optionally, the prepreg material may be partially cured prior to storage.

The precursor-impregnated substrates of the present invention will normally be shaped into a desired geometry before curing and subsequent conversion of the precursor to the corresponding ceramic matrix. This is particularly true of two-dimensional prepreg materials which may be cut and shaped in a wide variety of conventional geometries prior to curing. In the case of three-dimensional prepregs, it may or may not be necessary to further shape the prepreg in order to obtain the desired geometry.

After shaping, the prepreg will be cured (or partial curing will be complete) in order to set the desired geometry. The curing method will depend on the nature of the reinforcement substrate and in particular on the nature of the organic precursor material. The curing will usually result in cross-linking of the precursor materials and will set the geometry of the composite matrix. The curing will also drive off any solvent and other volatile components which may be present initially or formed from polymerization.

For polysilanes, curing is accomplished at a temperature in the range from about 150° C. to 250° C., usually about 175° C. to 225° C., under non-oxidizing conditions for a period of from about one to ten hours. Optionally, three-dimensional preforms may be cured in a vacuum bag, with a vacuum being drawn in order to conform the bag to the shape of the article. The composite article is then heated, typically under a relatively low pressure of about 75 psi or less, for a time period of from about two to ten hours. Two-dimensional composite articles may optionally be cured in a hot press or an autoclave, if desired. The cured or partially cured composite articles obtained after the step may be stored or transported for further processing elsewhere, or may be immediately processed to produce the final composite article of the present invention.

Prepregs which are impregnated with aluminum oxide precursor material are also cured by heating, typically at a temperature in the range from about 125° C. to 200° C., usually from about 150° C. to 170° C., for a period of from one to three hours. Optionally, the three-dimensional prepregs may be cured in a vacuum bag, while two-dimensional prepregs may be cured in a hot press or autoclave. The cured or partially-cured composites obtained after such curing may be stored or transported for further processing elsewhere or may be immediately processed to product the final composite article of the present invention.

After curing, the ceramic precursor material is converted to the corresponding ceramic matrix material by pyrolysis or oxidation, depending on the nature of the precursor. Polysilane precursors are converted by pyrolysis, preferably in a three-stage process in a furnace under an inert atmosphere, typically argon or nitrogen. The first stage of the pyrolysis is performed at a temperature in the range from about 200° C. to 350° C., usually from about 300° C. to 350° C. for a period of from about one to five hours, depending on the particular polysilane. During the first stage, decomposition of the polysilane commences and volatile decomposition products are evolved and driven off.

After the initial decomposition stage is completed, an intermediate pyrolysis stage is commenced by slowly raising the temperature at a rate from about 5 to 10° C./hr. to a final temperature of about 400° C. This stage, which typically lasts from about 5 to 10 hours, is characterized by the rapid pyrolytic decomposition of the polysilane accompanied by a rapid evolution of carbon and hydrogen gaseous waste products. Care should be taken not to exceed the prescribed temperature increase rate since it will lead to an even more rapid evolution of decomposition gases, which can result in disruption and damage to the composite article being fabricated.

After the temperature of the composite article reaches about 400° C., the rate of evolution of gases diminishes considerably and the likelihood of damaging the ceramic diminishes since pores will have been formed in the matrix facilitating the escape of gases. Thus, from temperatures of about 400° C., the temperature rise can be much more rapid, typically being in the range from about 35° to 70° C. /hr., to a final temperature in the range from about 800° to 1600° C. This final stage, which lasts from about five to twenty hours is characterized by relatively slow evolution of gaseous waste products. The nature of the silicon carbide or silicon nitride ceramic matrix which results from the process is largely dependent on the final temperature reach. For final temperatures below about 1200° C., the ceramic matrix will generally be amorphous in nature. Conversely, for a final temperature in the range from about 1200° C. to 1600° C., the silicon carbide or nitride matrix will have a generally crystalline nature. All of the pyrolysis steps described above for the polysilane precursor materials will be performed at a pressure below about 50 psi, preferably below about 25 psi, and more preferably at atmospheric pressure. High pressure processes, such as sintering processes, require more extensive equipment to perform, and can result in degradation of the reinforcement substrate and a microstructure of the ceramic matrix, and can limit the geometric complexity of the products which are performed.

The liquid aluminum oxide precursor materials are converted to aluminum oxide ceramic matrix to exposure to an elevated temperature under oxidizing conditions. Usually, the temperature will be raised in a stepped profile from room profile to a final temperature over a period of from about 20 to 30 hours and will be held at the final temperature for a period of from about 2 to 10 hours. The gradual temperature rise allows thermal acclimation of the material as well as allowing the slow release of the oxidation products. The final temperature will be above about 800° C., usually being between 850° C. and 950° C.

Once the initial conversion of the liquid ceramic precursor material is completed, it will usually be desirable to perform additional densification steps in order to enhance the density and strength of the final composite article. Usually, the composite will be densified from about 1 to 10 additional times, more usually from about 3 to 6 additional times, depending on the desired final density. In this way, the product which may have an initial density of from about 1.5 to 1.8 g/cc for the polysilane precursors and from about 1.3 to 1.5 g/cc for the aluminum oxide precursors, may be increased to a final density in the range from about 2.0 to 2.5 g/cc.

Each stage of densification generally consists of introducing additional ceramic precursor material to the composite article, curing the precursor material, and converting the cured precursor to the final desired ceramic matrix. The precursor may be applied to the composite article by various conventional techniques, including immersion, spraying, spreading, and the like. Usually, the viscosity of the precursor will be substantially lower than that utilized for forming the prepreg, usually having a viscosity below about 500 cp, more usually being below about 300 cp. This is particularly true if the precursor is to be sprayed onto the composite article. Optionally, refractory interface layers can be introduced between successive layers of the ceramic matrix, typically by either chemical vapor deposition or by pyrolytic conversion of an organic material. Alternatively, metal refractory layers, such as nickel, may be introduced by electroless plating.

Referring now to FIG. 1, a system 10 for producing the ceramic-ceramic prepregs of the present invention is illustrated. The system comprises a feed roll 12 which comprises a two-dimensional woven ceramic fabric. The layer of fabric from the roll 12 is then immersed in a bath 14 of the liquid ceramic precursor material. In the bath 14, an excess amount of the precursor material is applied to the surfaces of the reinforcement fabric. The precursor is impregnated completely and uniformly within the reinforcement fabric by a pair of opposed rollers 16. Finally, the impregnated prepreg material may be wrapped in a take-up roll 18 with a protective layer 20 being fed in between successive winds on the roll. The rolled prepreg material may be stored for extended periods and, when desired, can be unrolled and shaped into a desired geometry prior to curing and conversion.

Although the foregoing invention has been described in detail for purposes of clarity of understanding, it will be obvious that certain modifications may be practiced within the scope of the appended claims.

What is claimed is:

1. A process for forming a prepeg material, said process comprising:

introducing a liquid ceramic precursor material onto a reinforcement substrate, wherein the liquid has a minimum viscosity of 1000 cp prior to introduction; and substantially uniformly impregnating substrate with the ceramic processor material.

2. A process for forming a ceramic prepreg material, said process comprising:

combining a liquid ceramic precursor material with an amount of a thixotropy modifying agent selected to provide a minimum viscosity of about 10,000 cp in the absence of applied pressure;

introducing the combined ceramic precursor material and thixotropy modifying agent to a reinforcement substrate; and applying sufficient pressure to the surface of the reinforcement substrate to substantially uniformly impregnate said substrate with the ceramic precursor material.

3. A process as in claim 1 or 2, wherein the reinforcement substrate is composed of a material selected from the group consisting of alumina, beryllium, boron carbide, boron nitride, carbon, silicon carbide, silicon dioxide, tungsten, zirconia, and combinations thereof.

4. A process as in claim 1 or 2, wherein the reinforcement substrate is formed as a fabric, tape, film, or three-dimensional structure.

5. A process as in claim 1 or 2, wherein the liquid ceramic precursor material is selected from the group consisting of polysilanes, polysilazanes, and ionic aluminum.

6. A process as in claim 5, wherein the liquid ceramic precursor material is applied by immersion or spreading.

7. A process as in claim 1 or 2, wherein pressure is applied by opposed rollers.

8. A process as in claim 1 or 2, further comprising forming a refractory interface layer over the reinforcement substrate prior to introducing the liquid ceramic precursor material.

9. A process as in claim 1 or 2, wherein the liquid ceramic precursor material contains a preselected amount of a filler material selected from the group consisting of ceramic fibers and powders.

10. A process as in claim 2, wherein the thixotropy modifying agent is selected from the group consisting of polyethylene fibers, nylon fibers.

11. A process as in claim 10, wherein the thixotropy modifying agent is combined with the liquid ceramic precursor material in an amount from about 1% to 2% by weight.

12. A process as in claim 1 or 2, further comprising heat treating the impregnated substrate to evaporate solvent or partially cure the liquid ceramic precursor material.

13. A process as in claim 1 or 2, wherein the ceramic prepreg material is rolled with a separation sheet between successive layers for storage prior to use.

* * * * *